United States Patent

[11] 3,583,729

| [72] | Inventor | Richard J. De Groot<br>Revere, Pa. 18953 |
|---|---|---|
| [21] | Appl. No. | 819,041 |
| [22] | Filed | Apr. 24, 1969 |
| [45] | Patented | June 8, 1971 |

[54] AUDIOVISUAL INFORMATIONAL APPARATUS
5 Claims, 4 Drawing Figs.

[52] U.S. Cl............................................... 281/31,
35/8
[51] Int. Cl..................................................... B42d 3/18
[50] Field of Search............................................ 35/8.1,
35.3; 40/28.1, 104.19; 281/31

[56] References Cited
UNITED STATES PATENTS

| 3,181,894 | 5/1965 | Holtzman................... | 281/31 |
| 3,503,141 | 3/1970 | Schwartz...................... | 35/8 |
| 2,524,143 | 10/1950 | Smith.......................... | 35/8(.1)UX |
| 3,352,027 | 11/1967 | Schwartz...................... | 35/8(.1) |

*Primary Examiner*—Wm. H. Grieb
*Attorney*—William K. Serp

ABSTRACT: An informational apparatus which includes a plurality of pages of printed material and means for storing a recorded audio message integrally therewith. A preferred embodiment of the apparatus resembles the shape and construction of a book. The printed pages of a single signature are disposed on both sides of an audio recording storage case. The signature is secured to the case so as to form a complete unit. The case includes a frame defining an opening therethrough. Secured by suitable adhesive to the front and back surfaces of the frame and obstructing a portion of the opening defined by the frame is an inner cover. In this manner, a pocket is formed within the frame for receiving and securely retaining an audio recording.

PATENTED JUN 8 1971 3,583,729
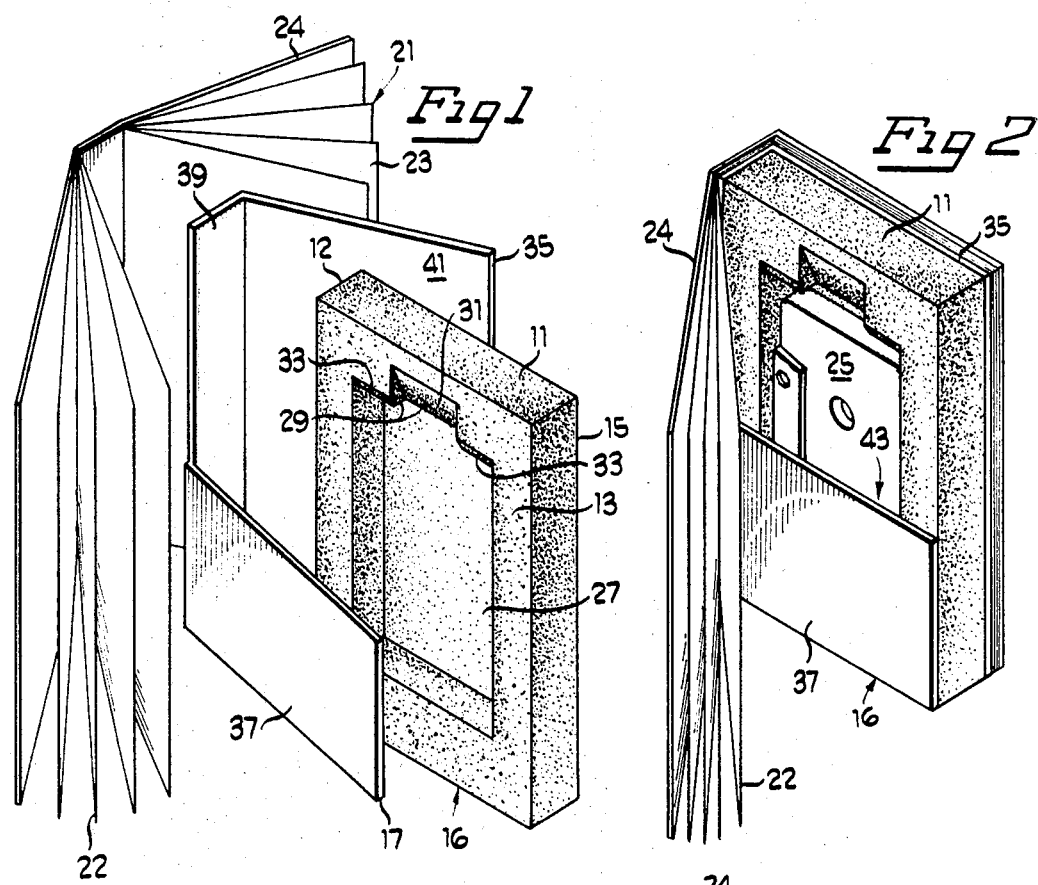
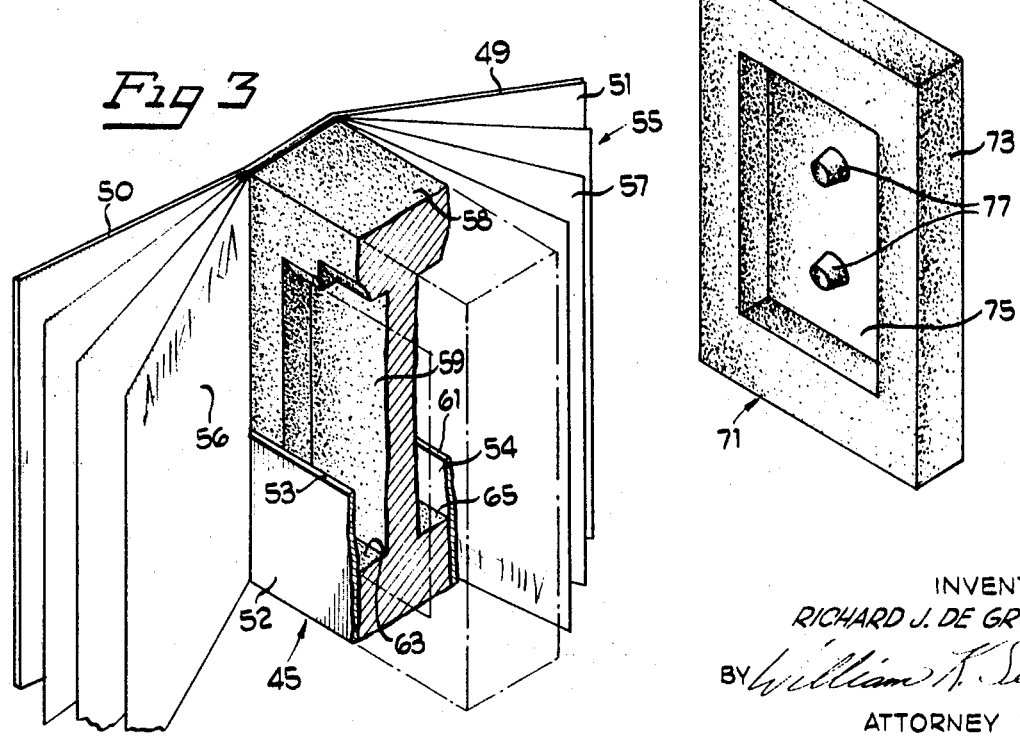
INVENTOR
RICHARD J. DE GROOT
BY William R. Serp
ATTORNEY

AUDIOVISUAL INFORMATIONAL APPARATUS

BACKGROUND OF THE INVENTION

It is generally recognized that the ability of an individual to absorb information, whether it be news, language or other informational material, increases in direct relation to the number of facilities which the individual is required to exercise during the learning process. For example, it has been found that when a visual presentation is accompanied by an audio or sound presentation, the comprehension and retention of the material by the individual is greatly increased. Various means have previously been used to accomplish this result. Language records as well as children's records are frequently accompanied by a book which is used in conjunction with the records. In the case of language records, the audio presentation serves to provide the phonetic instruction and is keyed to the book which provides the visual presentation. Often, rather than supplying the audio message in the form of a record, a magnetic tape is provided together with the accompanying book.

A particular disadvantage of such an arrangement is that the book and recording tape or record are supplied as separate items. The items are individually stored, and frequently one or the other becomes lost or misplaced. Since the material from the two sources is effectively interrelated, the value of either is greatly reduced without the complementary material provided by the other.

Particularly, when the informational material concerns news items, the book or pamphlet as the case may be is often interlaced with advertising material which helps to defray the cost of the combined package to the user. It is well recognized that the value of any advertising media to the subscriber is determined by the number of times it is exposed to the prospective consumer. The advertising message is usually presented in the book or pamphlet which is often that portion of the combined package lost or mislaid. Further, the consumer, after the initial presentation, frequently listens to the recording without referring to the publication.

The illustrated embodiment of this invention overcomes these disadvantages by providing an audiovisual informational apparatus whereby the audio material is integrated in a physical as well as text form with the visual presentation. As a result of this feature, the possibility of separating the two components of the combination is greatly reduced. Further, since the recording tape is stored with the printed text, the user is exposed to the advertising message each time either component of the combination is used. Other features and advantages of the invention will become apparent with reference to the following description and accompanying drawing which illustrates a preferred embodiment of the invention.

BRIEF DESCRIPTION OF THE DRAWINGS

FIG. 1 is an exploded perspective view of an audiovisual informational apparatus embodying certain features of this invention.

FIG. 2 is a perspective view of the informational apparatus of FIG. 1 in its assembled form showing, for purposes of illustration, a recording tape cassette positioned therein.

FIG. 3 is a perspective view of an alternate embodiment of the audiovisual informational apparatus embodying certain features of this invention.

FIG. 4 is a perspective view of a component of still another alternate embodiment of the audiovisual informational apparatus embodying certain features of this invention.

DESCRIPTION OF THE ILLUSTRATED EMBODIMENTS

Briefly, the embodiment illustrated in FIGS. 1 and 2 comprises a rectangularly shaped recording tape cassette support frame 11 having a back 12 and front and rear surfaces 13 and 15 respectively. An inner cover 17 is caused to adhere to the back 12 and surfaces 13 and 15 by means of a strong adhesive thereby forming a case 16 particularly suited for receiving a recording tape cassette. The entire apparatus is completed by binding with the inner cover 17 a signature 21, having first and second pages 22 and 23, an outer cover 24. With respect to FIG. 2, the apparatus is illustrated in its assembled form with a recording tape cassette 25 suitably positioned. While the apparatus is described for use with a recording tape cassette, it should be understood that the case 16 can be designed to receive various other recordings such as, but not limited to, a disc or wire recording cassette.

More particularly, the support frame 11 is rectangular in shape and defines a rectangularly shaped opening 27. The opening 27 is preferably larger than the overall size of the cassette 25 so as to facilitate insertion and removal of the cassette therefrom. The frame 11 may be constructed of any lightweight material. Particularly suitable materials are styrofoam and plastic. Further, the frame 11 may be readily formed from a single sheet of styrofoam by a relatively simple stamping operation.

So that the cassette may be readily grasped when seated within the frame 11, an upper edge 29 of the frame 11 is cut with a taper 31 which is centered with respect to the width of the opening 27 and extends for a distance of approximately one-half the length of the edge 29. Further, the remaining portion of the edge 29 is bevelled as at 33. This feature facilitates the insertion and removal of the cassette 25 from the frame 11.

The inner cover 17 is of a shape generally similar to the pages 22 and 23 forming the signature 21. The inner cover includes a rear sheet 35, a front sheet 37 and a back 39. The size of the rear sheet 35 is approximately the size of the area defined by the rear surface 15 of the frame 11, and the height of the front sheet 37 is approximately one-half the height of the frame 11. As previously mentioned, the inner cover 17 is bound with the signature 21 and secured to the outer cover 24 with adhesive or other suitable means. Adhesive is placed upon the inwardly disposed surface of the back 39 of the inner cover 17, and the back 12 of the support frame 11 is caused to adhere thereto. An inwardly disposed face 41 of the rear cover sheet 35 is coated about its periphery with suitable adhesive and firmly pressed against the rear surface 15 of the frame 11. Similarly, the inwardly disposed face of the front sheet 37 is provided with a thin, U-shaped coating adhesive. The front sheet 37 is similarly pressed against the front surface 13 of the frame 11. In this manner, the frame 11, rear sheet 35 and front sheet 37 define a pocket 43 particularly adapted to receive the recording tape cassette 25.

The outwardly disposed faces of the front sheet 37 and the rear sheet 35 are particularly suitable for receiving thereon an advertising message. As is readily apparent, each time the user removes the cassette from the pocket 43, this advertising message will be disposed to his view. Additionally, the upper portion of the inner face 41 of the rear sheet 35 which is visible through the frame 11 may also display an advertising message. In this manner, a novel advertising arrangement is provided. The message is revealed upon removal of the cassette 25 from the pocket 43. The assembled apparatus is illustrated in FIG. 2. The pages 22 and 23 and the cover 24 may be printed with editorial text interspersed with suitable advertising material.

Briefly, the alternate embodiment illustrated in FIG. 3 includes a case 45 adapted to receive two recording tape cassettes, an outer cover 49 having faces 50 and 51, and an inner cover 52 including first and second faces 53 and 54. Sandwiched between the outer cover 49 and inner cover 52 is a signature 55 having first and second pages 56 and 57 respectively. While the case 45 is particularly adapted for receiving two recording tape cassettes, it should be understood that the case may be adapted to receive other types of recordings as previously discussed in connection with the embodiment of FIGS. 1 and 2. As illustrated in FIG. 3, the case 45 includes a frame 58 displaying an "I" in cross section and defining two compartments 59 and 61. The compartments 59 and 61 are disposed respectively toward the faces 53 and 54 of the inner cover 52. Further, each of the compartments 59 and 61 is slightly larger and similar in shape to a recording tape cassette. The frame 58 is preferably molded of styrofoam, plastic or other suitable material as a complete unit. The embodiment of FIG. 3 is assembled in a manner similar to that described in connection with the previous embodiment. In this manner, a pair of pockets 63 and 65 are formed, each of which is suited for receiving a recording tape cassette.

The embodiment illustrated in FIG. 3 is particularly adapted for providing two books within a single cover. For example, the editorial and advertising material printed upon the pages 56 as well as upon the face 50 of the outer cover 49 may be printed so that the apparatus, when oriented in the position of FIG. 3, displays the information in proper reading orientation. This material forms the editorial text for use in combination with the audio message recorded upon the cassette contained within the pocket 63. In use, the book is rotated endwise through 180°. So that the advertising and editorial text will be maintained in proper orientation, the printing on pages 57 and face 51 of the inner cover 49 is reversed from that on pages 50 as illustrated in FIG. 3. Similarly, this material forms the editorial text for use in combination with the audio message recorded upon the cassette contained within the pocket 65.

With respect to the component of FIG. 4, a case 71 is illustrated which, as previously discussed, may be molded of plastic, styrofoam or other suitable material. The case 71 includes a rectangular frame 73 having a back 74 and a rear wall 75. Serving to retain the cassette in place within the case 71 and assure proper alignment therein is a retaining means in the form of orienting pins 77. The orienting pins are preferably molded integrally with the rear wall 75. The pins 77 are shaped to engage the holes defined by the tape spools of the cassette 25. During assembly, the back 74 is coated with adhesive and pressed directly against the signature in a manner similar to that discussed in connection with the embodiment illustrated in FIGS. 1 and 2.

Each of the illustrated embodiments provide a convenient means for integrating visual as well as audio informational material. Although only three embodiments of this invention have been shown and described, it should be understood that the details of the construction illustrated may be altered without departing from the scope and spirit of this invention.

What I claim is:

1. An audiovisual instructional apparatus comprising at least one signature having a plurality of pages, at least a portion of said pages having imprinted thereon informational matter, a case of relatively lightweight material secured to said signature, an outer cover surrounding said signature and said case and secured to said signature, said case comprising a rectangular frame having front, rear and side surfaces, said first surface having a depression therein for receiving a magnetic tape cassette, an inner cover comprising a front leaf, as rear leaf, and an intermediate strip joining said front and back leaves, one of said side surfaces of said frame being adhered to said intermediate strip and said front and rear leaves of said inner cover being adhered to said front and rear surfaces of said frame respectively, said front leaf overlying only a portion of said front surface and cooperating with said depression to form a compartment for retention of said cassette.

2. The audiovisual apparatus of claim 1 and including a second depression in said rear surface of said frame for receiving a second tape cassette, and wherein said rear leaf of said inner cover only partially overlies said rear surface and cooperates with said depression to form a compartment for retention of said second cassette.

3. The audiovisual apparatus of claim 2 and the information printed upon opposing pages of said signature is inverted with respect to each other.

4. The audiovisual apparatus of claim 1 wherein said depressed area is defined by inwardly directed sidewalls and including a beveled portion in one of said sidewalls to facilitate the insertion or removal of said cassette from said depressed portion.

5. The audiovisual apparatus of claim 1 and including cassette-engaging retention means in the bottom of said depression.